Patented Jan. 10, 1939

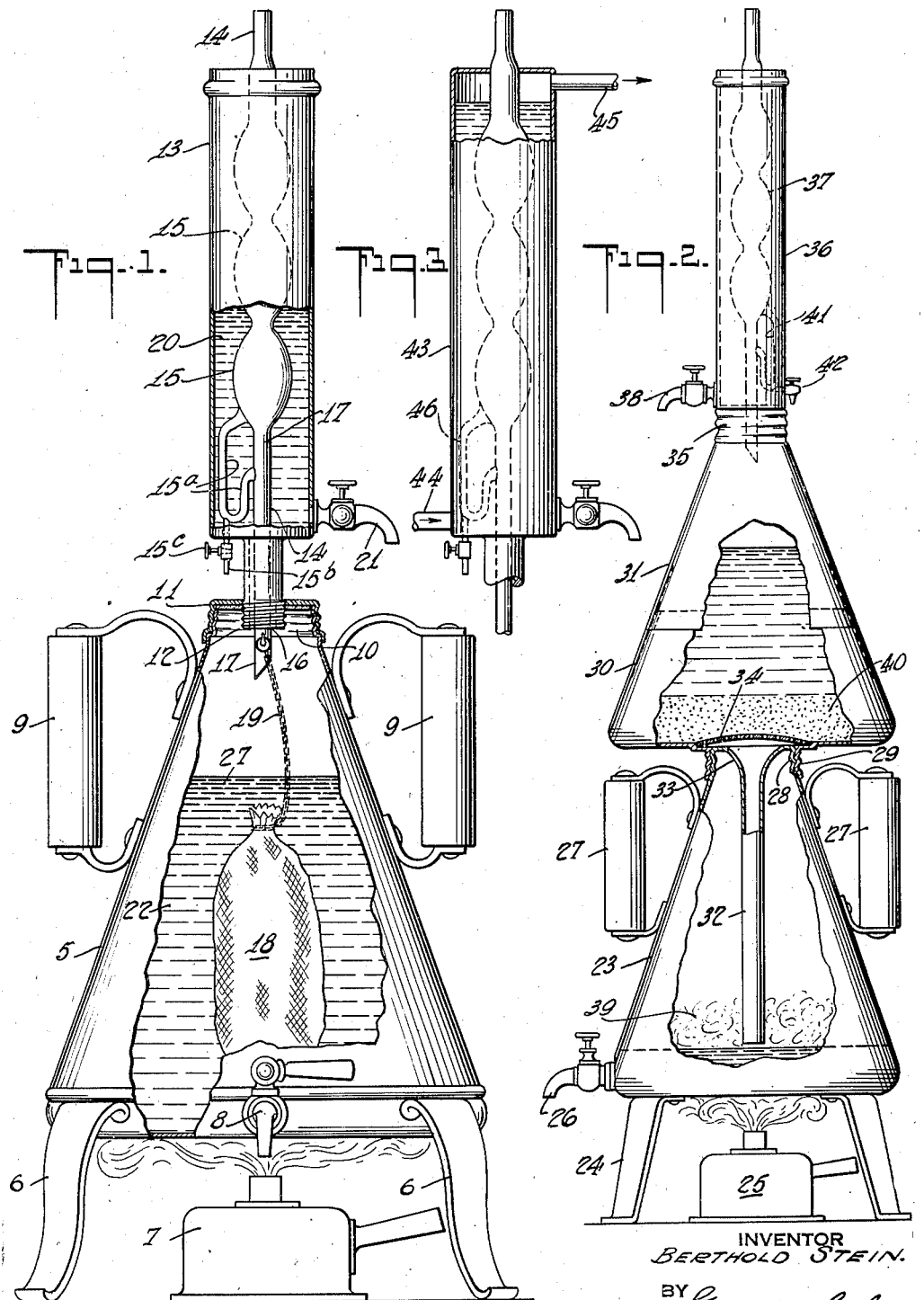

2,143,585

UNITED STATES PATENT OFFICE 2,143,585

APPARATUS FOR MAKING COFFEE BEVERAGES

Berthold Stein, Brooklyn, N. Y.

Application January 7, 1938, Serial No. 183,769

4 Claims. (Cl. 53—3)

This application is a continuation in part of my application filed March 1st, 1935, Serial No. 8,836.

The making of good and palatable coffee beverages depends largely on the way in which coffee beans are roasted, whatever their quality may be, but also on the process of and apparatus for making the same. With an incorrect or inefficient process of making coffee beverages even the very best grade of coffee can be spoiled, and hence, only a very poor product or beverage will be obtained.

A great many processes of making coffee beverages are known, but these can be classified in two main groups: First, by boiling the comminuted coffee beans in water, and, second, by only infusing the coffee with or in water.

The process of boiling coffee is done in such a way that steam is allowed to escape, carrying with it the most valuable ingredients of the roasted and comminuted or ground coffee beans, namely, the volatile aromatic oil, and also certain amounts of caffein, which are volatilized by water vapors. Or, the beverage contains objectionable substances which should have been removed. If the ground coffee or coffee powder is boiled with water in a hermetically closed vessel, higher pressures and temperatures way above the normal boiling point of water (100 degrees C.) will be produced, thereby causing decomposition of several of the desirable organic substances of the coffee, particularly those of aromatic and alkaloid character, and albuminous matter, which results in disagreeable tastes and an unpleasant odor and produces a beverage unfit to drink.

The infusion method consists in treating comminuted coffee beans with hot water, which at the commencement of the boiling operation or when the boiling hot water is taken from the fire has a temperature of 99 degrees C. As soon as such boiling hot water comes in contact with the comminuted or ground coffee the temperature thereof immediately drops several degrees, as the water is no longer boiling. Within two minutes the temperature drops to approximately 66 degrees C., if such operation takes place at the average room temperature, which is about 70 degrees F. It is immaterial whether the hot water is poured over the comminuted coffee or the coffee is placed into the hot water, as the temperature will drop continuously while the heating of the chamber or vessel is not maintained.

I have discovered a process of making coffee beverages wherein I use a chamber or vessel in which the beverage can be boiled continuously without at the same time, allowing the escape of any vapors or causing the raising of the temperature above the normal boiling point of water, or the raising of the pressure in the chamber or vessel. Preferably, I obtain the desired effect by attaching a reflux condenser to the otherwise completely closed chamber or vessel, with the result that I have been able to obtain a greater yield of improved quality of coffee beverage or dry coffee extract. While thereby the valuable vapors are condensed and retained, I preferably also eliminate certain objectionable substances by trapping them at the beginning of or during the preliminary brewing of the beverage, to thus remove such substances and to improve the taste and aroma of the finished beverage.

To these ends, the chamber or vessel should be practically closed as far as any possible escape of vapors is concerned, the chamber being kept closed during the whole process, and preferably during the dispensing of the coffee beverage from the chamber or vessel. I have discovered that by my process not only can a coffee beverage be produced which has a higher content of organic substances, such as those of the desirable organic and alkaloid character, but that the disagreeable taste and unpleasant odor are eliminated.

In order that my invention may be fully understood with respect to the process and the apparatus preferred, I will now proceed to describe the same with reference to the accompanying drawing illustrating several embodiments of the invention, wherein—

Fig. 1 is a vertical sectional elevation of one construction of apparatus, parts being broken away;

Fig. 2 is a vertical sectional elevation of another form of apparatus, parts being broken away; and Fig. 3 shows a slight modification of each.

Referring to Fig. 1, there is illustrated an apparatus wherein the comminuted coffee may be boiled, the same comprising a chamber or vessel 5 preferably provided with legs 6 to elevate it above a suitable source of heat, as, for instance, a small heater 7, which may be provided with a Bunsen or other burner. It is preferred that the chamber or vessel be of the largest diameter at the bottom, or of frusto-conical or pyramidal shape, that is, to taper and become gradually smaller at the top. The chamber or vessel 5 preferably is provided with an openable and closable dispensing device or faucet 8, (shown as closed), which is located near the bottom thereof so that the finished coffee beverage can be drawn off, as is preferred, to the exclusion of outside air, for reasons which will become obvious herefrom. The chamber 5 may also be provided with a pair of handles 9. It may have a glass water gauge if desired.

The upper end of the chamber 5 is provided with a screw-threaded neck 10, the diameter of which is preferably less than any diameter taken through the chamber 5 proper so as to provide a neck 10 of restricted diameter, onto which there may be threaded a screw-threaded cap 11, which closes the top of the chamber 5. The screw connection between the neck 10 and the cap 11 should be absolutely closed against the escape of any steam or vapors, or the entrance of outside air, which might otherwise seep into the chamber 5. The cap 11 is provided with an internal screw neck 12, which extends downwardly therefrom, preferably coinciding with the vertical axis of the chamber 5 and serving for the purpose now to be described.

Above the chamber 5, that is, above the screw cap 11 or the like, there is supported a reflux condenser, which includes a casing 13 to provide a jacket for holding cooling water around the axial tube 14 and which may be introduced through its upper end. Tube 14 extends above the casing 13 and is preferably formed with enlargements or bulbs 15 so as to increase the area of the inner surface on which the steam and vapors are condensed by and in the tube. It will be obvious herefrom that the condenser may be made as large as desired in cases where larger quantities of coffee beverage are to be produced, in which cases the container for the coffee beverage will, of course, be modified and enlarged.

The lower end of the reflux condenser is provided with a screw neck 16 of such size as to permit it to be screwed air-tight into the screw neck 12 of the described cap. The lower end 17 of the tube 14 is tightly fitted into the screw neck 16 and extends a suitable distance into the upper part of the chamber or vessel 5, so as to be located near the very top thereof, its lower end being preferably beveled off in order to facilitate the drip of the condensate which is produced in the condensing tube 14.

The apparatus now being described is proposed to be so constructed that a porous filtering bag 18 for containing a suitable quantity of comminuted coffee may be suspended in the chamber by means of a suspending element or wire 19, which may be attached to the inwardly-projecting end 17 of the condenser. Of course, the suspension of the coffee bag may be done in other obvious ways. The cooling water 20 in the water jacket of the condenser may be drawn off when ineffective by a faucet 21, which is supposed to be closed in the position shown.

The chamber or vessel 5 is intended to be charged through its top opening with sufficient cold water 22 so as to be in more or less definite proportions in relation to the amount of comminuted coffee which is contained in the suspended bag 18. The bag 18 may be made elongated so that when filled with the coffee to be boiled it may be passed through the opening formed by the restricted neck 10.

Assuming that the apparatus has been prepared for use by placing the proper amounts of water and comminuted coffee within the chamber 5, and placing the required cooling water in the casing 13 of the condenser, the substantially closed apparatus may be placed over the source of heat 7. When the water reaches the boiling point, steam is generated, but it cannot pass out of the apparatus at all because the chamber 5 is practically closed by and only by the reflux condenser 13, 14 at all times during the process. The steam generated and any vapors which are produced from the coffee by the action of the boiling water flow up into the condensing tube 14 of the condenser and are therein condensed, the boiling being preferably continued for a period of approximately ten minutes. At the end of such period of time as is found best in practice, the finished coffee beverage may be drawn off through the discharge device 8 by opening it. When there is any coffee beverage remaining in the chamber 5 it is closed by means of the condenser and the device 8, thus assuring the retention of all the aromatic substances of the coffee.

During the process of making the coffee beverage I preferably eliminate certain objectionable substances by trapping them at the condensing tube 14 of the reflux condenser. Among these substances are acetone, methylamine, and derivatives of pyridine. They have a very nauseating odor and disagreeable taste and it is essential to remove them from the beverage, thereby greatly improving the quality of the finished beverage. The separating out of such substances is accomplished at the commencement of the condensing step in the process, and this can be accomplished because these substances evaporate from the heated chamber or vessel 5 in which the beverage is to be boiled, before the boiling point of water is reached. Acetone and methylamine evaporate below the boiling point of water and mixtures thereof do so likewise. The boiling point of acetone is 56 degrees centigrade and methylamine 10 degrees centigrade.

Means for eliminating these disagreeable substances are illustrated in Fig. 1, such means preferably being provided by a U-shaped tube 15a having a long leg and a shorter leg upstanding vertically from the bow or bend of the U. The longer leg communicates at its upper end with the lower end of the lower enlargement or bulb 15 of the tube 14, while the shorter leg communicates at its upper end with said tube at a point below the inlet port of the U-shaped tube 15a Inasmuch as the inlet port of the tube 15a is in the lower tapering end of the lower enlargement or bulb 15 the undesirable substances are condensed on the inner surface of tube 14 at points above such port, which is due to the cooling effect of the cold water in the casing of the condenser. When these substances are so condensed they flow downwardly along the inner surface of the tube 14 and when they reach the U-shaped tube 15a they flow thereinto, and this is due to the fact that the said taper guides the condensed substances into the tube 15a and they do not flow down below the lower bulb 15 or the inlet. It may be found desirable to arrange a number of these U-shaped tubes, such as 15a, upon and around the tube 14. After entering the U-shaped tube 15a the condensed undesirable substances flow down into the lower bend of the tube 15a and are there trapped, and are prevented from flowing from the condensing tube 14 into the coffee beverage which is being produced. Such trap therefore intercepts the undesirable condensate and prevents it from flowing out from the lower leg of the tube 15a. After these objectionable substances have been eliminated and collected in the trap 15a, all the valuable volatile substances are condensed in the upper part of the condenser and such condensate flows down the tube 14 and into the vessel 5 in which the beverage is being prepared.

Preferably suitable means are provided for removing the trapped condensate from the U-shaped tube 15a. Such means may consist of an outlet tap or pipe 15b which is controlled by a valve 15c. As the trapping tube 15a is located within the reflux condenser, it is obvious that the outlet 15b therefrom should be suitably packed where it passes through the casing 13, in order to prevent leakage of the cooling water 20. When it is convenient to open the valve 15c, that may be done in order to discharge the undesirable trapped condensate from the trapping tube 15a. The size of the trapping tube 15a will of course be determined by the size of the apparatus for producing a given amount of coffee beverage as the greater the amount of coffee beverage to be produced the greater will be the amount of undesirable substances which are to be intercepted so that they cannot flow down into the coffee beverage.

From repeated tests and demonstrations I have found that my improved process and apparatus will do what I claim for it. In prior apparatus all vapors are not returned toward or into the coffee pot. Also, such apparatus is operated by pouring boiling water upon the ground coffee and sometimes thereafter the boiling is promptly continued, with the result that aromatic substances are soon lost. Also, in such prior apparatus there is a pseudo or make-shift condenser which acts as a heating device. Also, in such prior devices the water which is intended to accomplish the cooling, and hence the condensing, takes up some of the aroma and flavor of the coffee. Also, they heat the water rapidly to boiling temperature so that certain ingredients of the coffee react on each other and thus lose their essential character to a greater or less extent. Also, in some of the prior devices making use of an upper receptacle, the liquid will only seem to boil, that is, it will only appear to boil, as it only bubbles in a way to resemble boiling and it has not reached the boiling temperature at all, the temperature then being approximately 70 degrees C.

The knowledge of the chemical composition of the actually important substances responsible for the quality of a coffee beverage is rather inexact according to standard literature. I have found that certain undesirable tastes in coffee beverages are caused by substances of an albuminous nature. It is generally known that coffee beans, after they have been roasted, contain from 13–16% of aluminoids. The exact formulae of the molecule of these albuminoids have never been determined with certainty. However, I have found that the same are soluble in cold and in medium warm water. When, however, heated to 70 degrees C., and as high as 98 degrees C., they coagulate and become insoluble. I have isolated the albuminoids and have discovered that they have a very disagreeable taste and if in solution they are responsible for the disagreeable taste prevailing in coffee beverages. Often this disagreeable taste is partly hidden by the aromatic substances. The carrier of the aromatic substances is an essential oil, which, however, is present in a very minute amount in the coffee bean. By investigation there has been obtained out of 100 grams of roasted coffee .01 gram of an oil which has the characteristic odor of all species of coffee and the boiling point of which is between 197–202 degrees C. I have discovered that this oil is easily oxidized by atmospheric air which changes it so as to have a very disagreeable odor, and if sufficiently oxidized by the air it is changed to such an extent that it makes a coffee beverage unfit for drinking.

The findings above given demonstrate why I consider that the best chamber or vessel in which to boil coffee is of a cone or pyramid shape, as during the process of boiling and during the retention of the beverage thereafter in the chamber, it will be subject to contact with less air than in a vessel of straight cylindrical shape, bowl shape or some such shape; hence, the chamber 5 illustrated is of the shape referred to. As the boiling point of the aromatic oil is so high, as before stated, a greater part of such oil will get into solution in the liquid in the chamber 5 if the same is at a temperature of 98 or 100 degrees C. than if the temperature is only at 60 degrees C. The average temperature in the infusion processes varies from 55–65 degrees C.

I have found that by boiling the coffee instead of by infusion, I obtain a 50% greater amount of desirable soluble extract. While by the infusion method the obtained extract varies from 7–10%, I have obtained by the boiling process from 18–21% of dry extract.

Heretofore all devices for making coffee beverages have had some openings which let the steam escape while some even have no cover at all, the makers and users of such devices evidently not knowing how important it is that the beverage must not come in contact with air. Hence, the preferred conical or tapering shape of the chamber 5, so as to reduce to a minimum the space at the top which is above the body of water 22, and the direct entrance of outside air being absolutely prevented by the presence of the reflux condenser 13, 14 in the process, which condenser returns to the boiling coffee beverage in the chamber the steam and vapors in condensed form which have been emitted therefrom, but which do not escape through the tube 14 of the condenser.

It is generally known that wherever coffee is made the whole premises are filled with the strong odor of coffee, and the best of the coffee is really discharged into the kitchen. This is of course all the more the case if the coffee is prepared by boiling it in a vessel which will allow the escape of vapors, so that the loss of the aroma is the greater and the quality of the obtained beverage is still poorer. In the described apparatus, Fig. 1, the boiling chamber is closed by the condenser, and the boiling can be continued almost indefinitely, and not a trace of coffee aroma will be noticeable in the room in which the boiling takes place, despite the boiling beverage having a temperature of approximately 100 degrees C.

Referring to Fig. 2, the process is not that of boiling the comminuted coffee directly in the boiling water, but by the action of steam in an upper chamber. This apparatus comprises a vessel or chamber 23 having legs 24 and heated by a heater 25, and provided with a draw-off faucet 26 and with handles 27 for lifting the apparatus, all similar to these parts of the apparatus in Fig. 1. The top of the chamber 23 is provided with a screw neck 28, onto which may be screwed airtight a depending screw neck 29 on the upper chamber or vessel 30, 31. The two chambers 23 and 30, 31 are conical or the like for reasons before stated.

The upper chamber is preferably composed of two sections 30, 31, which may be fitted leak-tight together. Also from the bottom of the upper chamber 30, 31 there depends a tube 32, which extends preferably coincident with the axis of the chamber 23, and dips into the latter for a considerable distance, preferably as shown. The extremity of the tube 32 will be fairly close to the bottom of the chamber 23, for example, one-half an inch. The upper end of the tube 32 flares towards the screw neck 29, and with the latter is suitably secured to the bottom of the section 30 of the upper chamber. The upper end of the tube 32 opens freely into the upper chamber, except that over its wide mouth 33 there is placed a grid or screen 34, which, in connection with a filter cloth or the like placed thereover, constitutes a filter, which, however, may be formed in any suitable manner.

The upper end of the chamber 30, 31 is connected by a screw connection 35 with the lower end of the casing 36 around the condensing tube 37 of the reflux condenser. This is also provided with a draw-off faucet 38 similarly to the condenser in Fig. 1. The boiling of the water in chamber 23 causes the same to be gradually forced down therein and to pass up through the tube 32 and the filter 34, where it comes into contact with the body 40 of comminuted coffee in the chamber 30, 31. The reflux condenser 36, 37 acts to condense the steam and vapors which emanate from the chamber 30, 31 while the water 39 is boiling in both chambers 23 and 30, 31.

When the process of boiling is discontinued by discontinuing the heat, the liquid which has been forced into the upper chamber 30, 31 gradually drips through the filter 34 and into chamber 23, thus separating the solids, that is, the residue, from the beverage by filtration. If desired, a cooling water jacket may encompass the lower chamber 23 to hasten the filtration.

The undesirable albuminoids which have been coagulated by boiling are retained on the filter 34, together with the other insoluble matter. Then, the undesirable albuminous matter will not be present in the finished coffee beverage contained in the lower chamber 23, as is the case in those processes which are carried out below the boiling point. The absence of the albuminoids in the finished coffee beverage results in obtaining a pure coffee flavor. Also, by the improved process, all of the caffein is recovered, which otherwise may partly have escaped, it being volatilized and condensed with the water vapors. All the aroma is retained in the coffee beverage, giving it the desired characteristic and pleasant pure coffee aroma and flavor.

The albuminous matters which are coagulated above the filter 34 also acts as a filter bed, giving a finer filtration, and, therefore, a clearer finished product.

In Fig. 2 the apparatus is shown as comprising a reflux condenser 36, 37 like that shown in Fig. 1, and with a draw-off faucet or tap 38. The trap 41 corresponds with what is illustrated in Fig. 1 in this respect and it is provided with a faucet or tap 42 for removing the trapped liquid.

In Fig. 3 the reflux condenser 43 is for a large capacity coffee making apparatus and is provided with an inlet 44 for cold water and with an upper outlet 45 for the said water at its higher temperature. These ports 44, 45 provide for a continuous upward flow of the water. A trap 46 is also illustrated similar to the trap shown and described with respect to Fig. 1.

What I claim is,—

1. In combination, a chambered apparatus wherein water may be boiled and comminuted coffee subjected to the action of the water, such chambered apparatus having a closable draw-off outlet for the beverage and being completely closed when in use except for a restricted opening at the top, a reflux condenser having its lower end fitted air-tight into the opening to prevent escape of steam and vapors, and means outside of and connected with the condensing tube of the condenser, for acting to remove and condense undesirable substances from the coffee before the water attains the boiling point, such means including a trap in which such substances are collected, and the trap having a controlled outlet outside of the condenser.

2. Apparatus for making coffee beverage, including a boiling chamber for receiving water and coffee, a reflux condenser thereon, and means in the cooling chamber of the condenser, and having a passage outside of and connected with the condensing tube of the condenser to separate and isolate undesirable substances from the coffee beverage before the boiling point is reached.

3. Apparatus for making coffee beverage, including a boiling chamber for receiving water and coffee, a reflux condenser thereon, and means in the cooling chamber of the condenser, and having a passage outside of and connected with the condensing tube of the condenser to separate and isolate undesirable substances from the coffee beverage before the boiling point is reached, such means including a trap also located in the cooling chamber of the condenser.

4. In combination, a chambered apparatus wherein water may be boiled and comminuted coffee subjected to the action of the water, such chambered apparatus having a closable outlet for the beverage and being completely closed when in use except for a restricted opening at the top, a condensing tube having its lower end fitted air-tight into the opening and its upper end open to the outer air, a cold water jacket around the tube to prevent escape of steam and vapors by condensing them in the tube, a separating tube for undesirable substances, outside of the condensing tube, located in the lower part of the water jacket and connected at both ends with the condensing tube, such outside tube having an outlet for the condensed undesirable substances, outside of the water jacket.

BERTHOLD STEIN.